United States Patent [19]

Chang

[11] Patent Number: 5,433,461

[45] Date of Patent: Jul. 18, 1995

[54] STRUCTURE OF HAND TRUCK

[76] Inventor: Wen-Chen Chang, No. 151, Chu Ho Road, Changhua City, Taiwan

[21] Appl. No.: 247,642

[22] Filed: May 23, 1994

[51] Int. Cl.$^6$ ............................. B62B 1/04; A45C 5/14
[52] U.S. Cl. .......................................... 280/37; 280/35; 190/18 A
[58] Field of Search ................. 280/37, 35, 651, 656; 180/906; 190/18 A, 39, 115; 301/128

[56]  References Cited

U.S. PATENT DOCUMENTS

| | | | |
|---|---|---|---|
| 2,132,316 | 10/1938 | Newton | 280/35 |
| 2,598,831 | 6/1952 | Ramey | 280/35 |
| 3,159,410 | 12/1964 | Raymond | 280/35 |
| 3,215,401 | 11/1965 | Grabarski | 280/35 |
| 3,923,318 | 12/1975 | Renard et al. | 280/35 |
| 3,963,256 | 6/1976 | Stafford | 280/35 |
| 4,261,447 | 4/1981 | Arias et al. . | |
| 4,340,132 | 7/1982 | Cerna . | |
| 4,480,851 | 11/1984 | St-Pierre | 180/906 |
| 4,538,709 | 9/1985 | Williams et al. . | |
| 4,545,592 | 10/1985 | Taskovic | 280/35 |
| 4,995,487 | 2/1991 | Plath . | |
| 5,121,808 | 6/1992 | Visentini et al. | 180/906 |
| 5,167,306 | 12/1992 | Carrigan, Jr. . | |
| 5,291,976 | 3/1994 | Ku . | |
| 5,295,565 | 3/1994 | Latshaw . | |
| 5,323,886 | 6/1994 | Chen . | |

FOREIGN PATENT DOCUMENTS 2688986 10/1993 France .

Primary Examiner—Mitchell J. Hill
Assistant Examiner—Carla Mattix
Attorney, Agent, or Firm—Merchant, Gould, Smith, Edell, Welter & Schmidt

[57] ABSTRACT

A hand truck for carrying luggage having two wheel holders slidably fastened to a base frame thereof at two opposite ends and locked in position by a respective lock pin. The base frame has a longitudinal through hole through two opposite ends thereof, and two series of pin holes longitudinally spaced near the two opposite ends and respectively perpendicularly communicated with the longitudinal through hole. Each wheel holder comprises a bearing plate provided with a wheel at the bottom, a mounting rod horizontally extended from the bearing plate at one side and slidably inserted into the longitudinal through hole on the base frame and releasably locked in position by a respective lock pin being inserted into either pin hole at either end of the base frame, the mounting rod having a longitudinal series of pin holes for alternatively connecting to either pin holes at either end of the base frame by the respective lock pin.

5 Claims, 4 Drawing Sheets

STRUCTURE OF HAND TRUCK

BACKGROUND OF THE INVENTION

The present invention relates to hand trucks, and more particularly to a hand truck for carrying luggage, wherein the hand truck can be adjusted to change the combined length of the base frame and wheel holders thereof so as to fit the length of the particular piece of luggage to be carried.

While traveling one may need to carry a lot of clothes and personal items within one or more pieces of luggage. A typical piece of luggage A, as shown in FIG. 1, has wheels A2 at the bottom and a hand carrying loop A1 at one side for pulling luggage A on the ground. Because the hand carrying loop A1 is on the outside and cannot be stowed inside luggage A, it may be caught by objects nearby. In order to prevent the hand carrying loop A1 from becoming entangled, the length of the hand carrying loop A1 must not be too long. However, a short hand carrying loop A1 is not suitable for transporting luggage A on the ground by a tall man. When such a tall man pulls the hand carrying loop A1 to move luggage A on the ground, he must bend his back, which will tire quickly. Furthermore, the hand carrying loop A1 only allows luggage A to be pulled on the ground. Because the hand carrying loop A1 is flexible, it cannot be pushed to move luggage A. Moreover, luggage A may fall while making a turn.

In order to solve the aforesaid problems various hand carrying trucks have been disclosed and placed in the market. FIG. 2 shows a hand truck for carrying luggage according to the prior art. The hand truck comprises mainly a base frame 6' having wheels at the bottom, two sleeves 3' perpendicularly and bilaterally connected to the base frame 6' at the top, a hand grip 2', two tubes 1' each having one end connected to either end of the hand grip 2' and an opposite end inserted into either sleeve 3', a locating frame 4' slidably connected between the sleeves 3', and a fastening device 5' for fastening the locating frame 4' to the luggage 7' to be carried. Although such a hand truck is functional, it cannot be adjusted to change the total length of the base frame 6' to fit different sizes of luggage. Therefore, different sizes of hand trucks must be provided for carrying different sizes of luggage.

SUMMARY OF THE INVENTION

The present invention has been accomplished under the circumstances in view. It is one object of the present invention to provide a hand truck which is suitable for carrying any of a variety of luggage. It is another object of the present invention to provide a hand truck which can be adjusted to fit the size of the luggage to be carried. To achieve these objects, the hand truck of the present invention comprises a base frame for carrying luggage, two sleeves perpendicularly and bilaterally connected to the base frame at the top, a hand grip, two tubes each having one end connected to either end of the hand grip and an opposite end inserted into either sleeve, a locating frame connected between the sleeves to hold down the luggage on the base frame, and two wheel holders each fastened to the base frame at two opposite sides thereof and having a wheel at the bottom, wherein the base frame has a longitudinal through hole extending through the base frame to the two opposite ends thereof, and two series of longitudinally spaced apart pin holes near the two opposite ends of the base frame and perpendicularly communicated with the longitudinal through hole; each wheel holder comprising a bearing plate provided with a wheel at the bottom, a mounting rod laterally extending from the bearing plate at one side and slidably inserted into the longitudinal through hole on the base frame and releasably locked in position by a lock pin being inserted into a pin hole at either end of the base frame, the mounting rod having a longitudinal series of pin holes for connecting to pin holes at either end of the base frame by using lock pins. By changing the positions of the mounting rod of either wheel holder in the longitudinal through hole on the base frame, the combined length of the base frame and the wheel holders can be adjusted to fit the size of the luggage to be carried.

DETAILED DESCRIPTION OF THE PREFERRED EMBODIMENT

Figure 1:
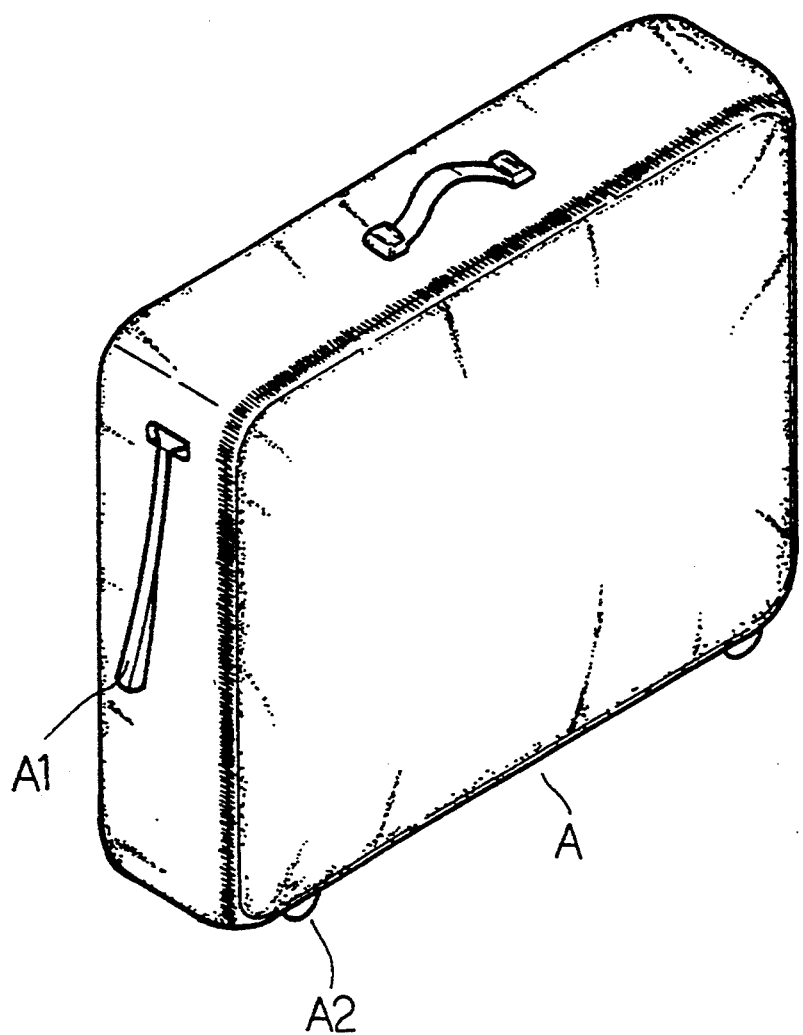
FIG. 1 shows a typical piece of luggage provided with wheels at the bottom and a hand carrying loop at one side.
Figure 2:
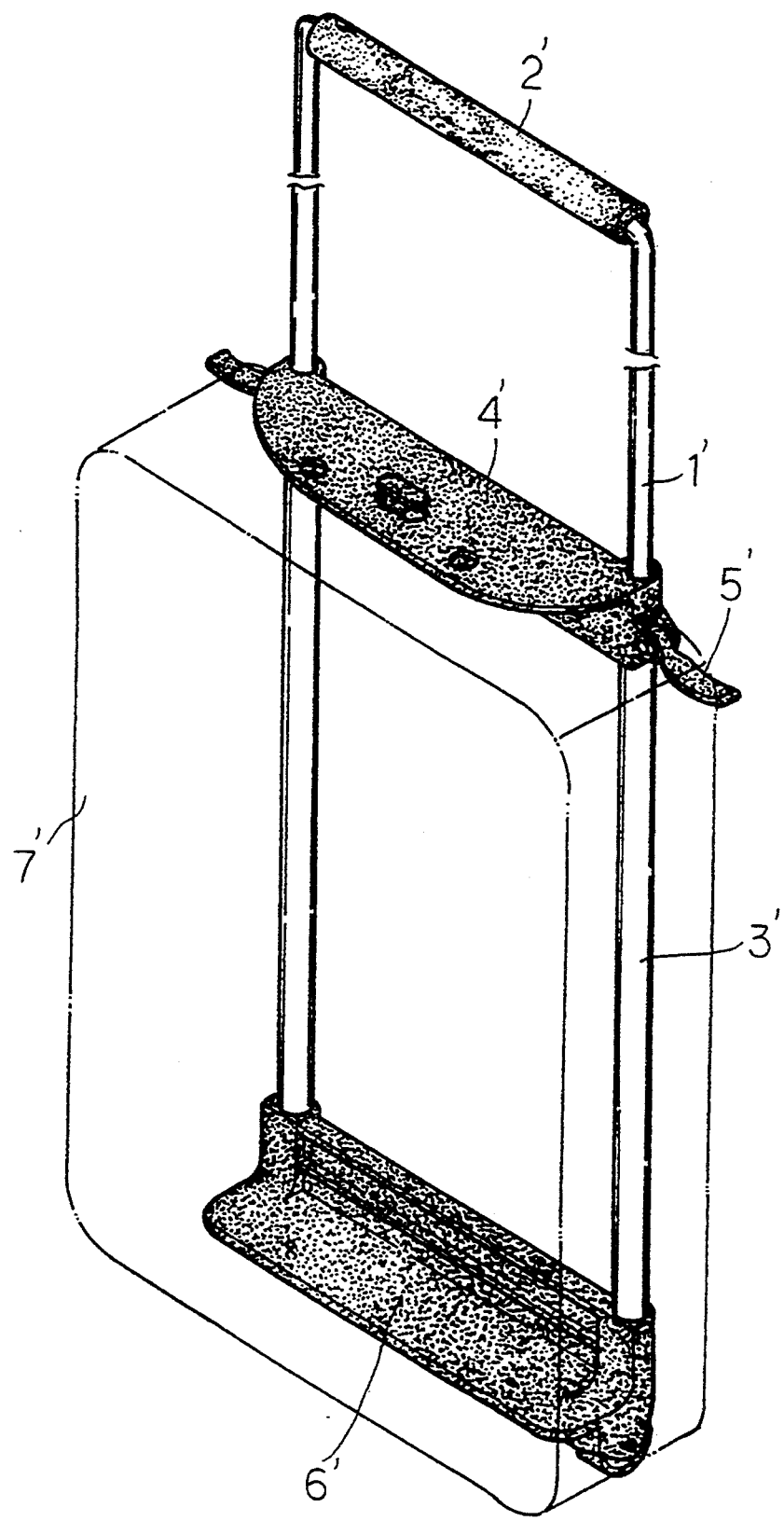
FIG. 2 shows a hand truck for carrying luggage according to the prior art.
Figures 3, 4:
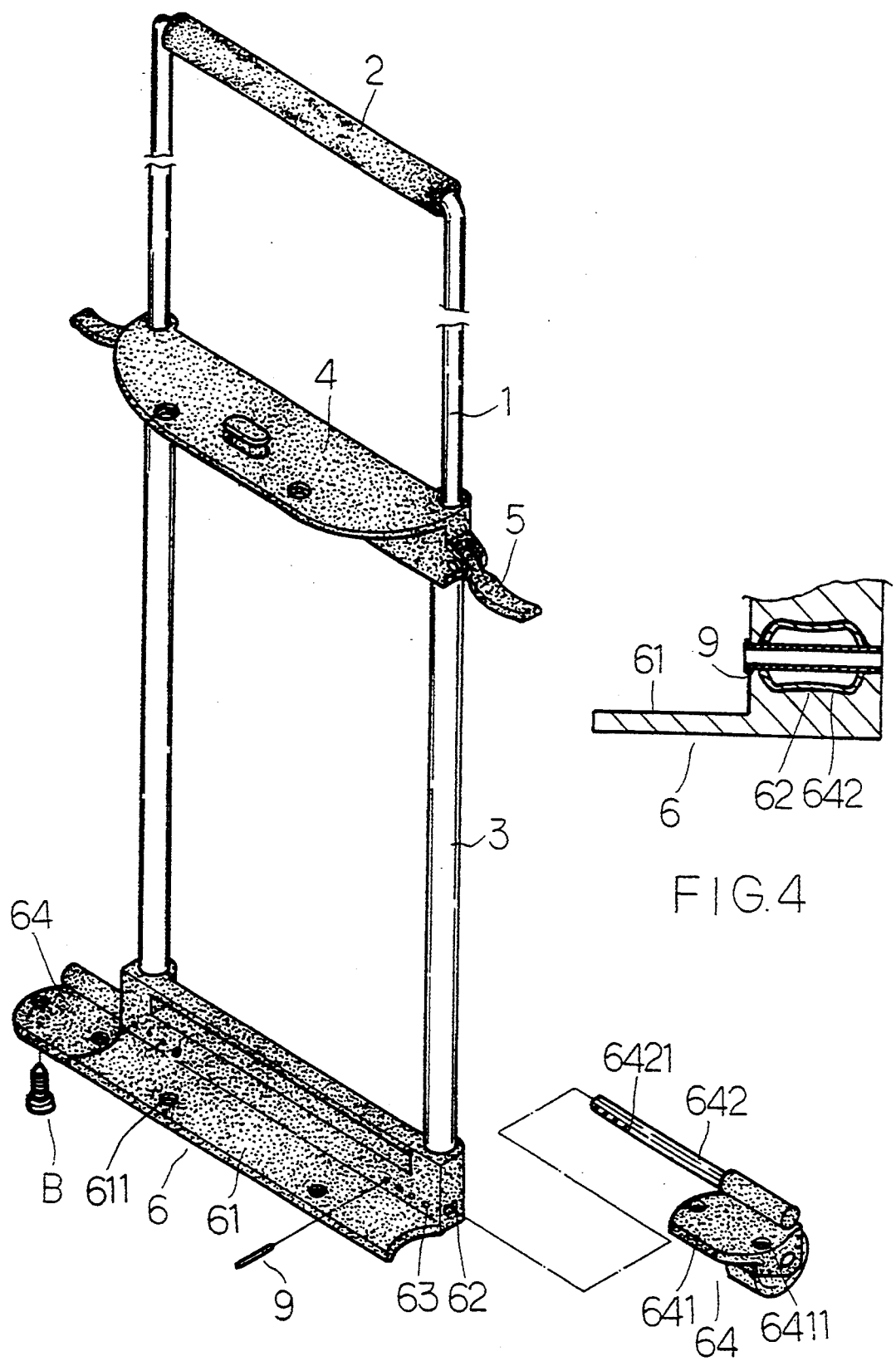
FIG. 3 shows a hand truck for carrying luggage according to the present invention.
FIG. 4 is a cross section taken on part of the hand truck shown in FIG. 3, showing the mounting rod of the wheel holder locked in the longitudinal hole on the base frame by a lock pin.
Figure 5:
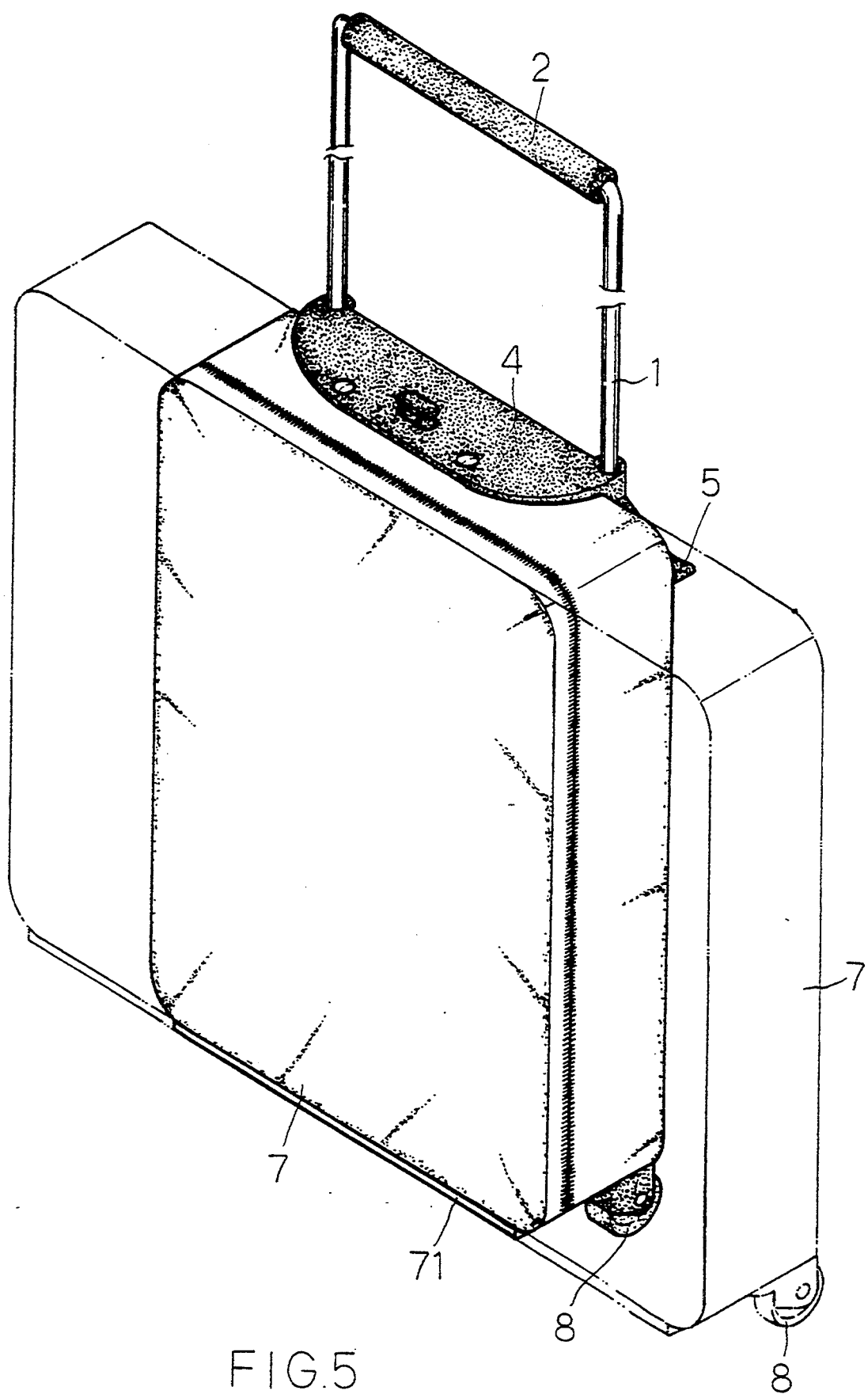
FIG. 5 shows the hand truck of the present invention adjusted to fit luggage being carried thereon.

Referring to FIGS. 3, 4, and 5, a hand truck in accordance with the present invention has a base frame 6, two sleeves 3 perpendicularly and bilaterally connected to the base frame 6 at the top, a hand grip 2, two tubes 1 each having one end connected to either end of the hand grip 2 and an opposite end inserted into either sleeve 3, a locating frame 4 slidably connected between the sleeves 3, and a fastening device 5 for fastening the locating frame 4 to the luggage 7 to be carried. The base frame 6 has a frame body 61 and two symmetrical wheel holders 64 fastened to two opposite ends of the frame body 61. The frame body 61 has a plurality of luggage mounting holes 611, a longitudinal through hole 62 extending through two opposite ends thereof at the back, and two series of longitudinally spaced apart pin holes 63 near the two opposite ends and perpendicularly communicating with the longitudinal through hole 62. The wheel holder 64 has a bearing plate 641 with a wheel 8 at the bottom and having two vertical luggage mounting holes 6411, and a mounting rod 642 laterally extending from the bearing plate 64 at one side and being inserted into the longitudinal through hole 62 from either end. The mounting rod 642 has a longitudinal series of pin holes 6421 for connection to the pin holes 63 on the frame body 61 of the base frame 6 by lock pins 9 (see FIG. 4). When luggage 7 is placed on the frame body 61 of the base frame 6, screws B are respectively inserted through the luggage mounting holes 611 on the frame body 61 and the luggage mounting holes 6411 on the bearing plate 641 of the wheel holders 64 into corresponding screwy holes (not shown) on the bottom panel 71 of luggage 7. Then the locating frame 4 is attached to luggage 7 at the top, and then the fastening device 5 is fastened to the luggage 7, causing the locating frame 4 to hold down the luggage.

Referring to FIG. 5 again, by adjusting the positions of the wheel holders 64 relative to the base frame 6, the combined length of the base frame 6 and the wheel holders 64 can be extended according to the size of the luggage 7 to be carried. Adjusting the combined length of the base frame 6 and the wheel holders 64 is easy and is done by removing the lock pins 9 from the frame body 61 of the base frame 6, then moving the mounting rod 642 in the longitudinal hole 62 inwards or outwards according to the size of the luggage 7 to be carried, and then fitting the lock pins 9 into a pin hole on the frame body 61 of the base frame 6 and into a pin hole 6421 on the mounting rod 642 of either wheel holder 64.

While only one embodiment of the present invention has been shown and described, it will be understood that various modifications and changes could be made without departing from the spirit and scope of the invention.

What is claimed is:

1. A hand truck for carrying luggage, said hand truck having a base frame and a mechanism for holding down luggage on the base frame, comprising:

a base frame having a longitudinal through hole extending through two opposite ends of said base frame, said base frame further having two series of longitudinally spaced apart pin holes, each series disposed towards a respective opposite end of the base frame and communicating with said longitudinal through hole;

two sleeves perpendicularly and bilaterally connected to an upper surface of each end of said base frame;

two tubes, each having a first end and a second end, the first ends of the tubes being inserted in the two sleeves respectively;

a hand grip having two ends, each end being connected to the second ends of the two tubes respectively;

two wheel holders adjustably fastened to said base frame at the two opposites end thereof, each of said wheel holders having a bearing plate, a wheel connected to a bottom side of the bearing plate, a mounting rod extending laterally from the bearing plate and slidably inserted into the longitudinal through hole of the base frame from one of the opposite ends of the base frame, said mounting rod having a longitudinal series of pin holes and being releasably locked in position in the base frame by a lock pin extending through one of the pin holes in the base frame and into one of the pin holes of the mounting rod.

2. The hand truck of claim 1 further comprising a locating frame connected between the sleeves for providing support for the luggage.

3. The hand truck of claim 1 wherein the mounting rods are smaller in cross-sectional size than the sleeves.

4. The hand truck of claim 1 wherein all the pin holes on the base frames are concentrated near the respective ends of the base frame.

5. A hand truck for carrying luggage, said hand truck having a base frame and a mechanism for holding down luggage on the base frame, comprising:

a base frame having a longitudinal through hole extending through two opposite ends of said base frame, said base frame further having two series of longitudinally spaced apart pin holes, all the holes in each series being concentrated near a respective opposite end of the base frame and communicating with said longitudinal through hole;

two sleeves perpendicularly and bilaterally connected to an upper surface of each end of said base frame;

two tubes, each having a first end and a second end, the first ends of the tubes being inserted in the two sleeves respectively;

a hand grip having two ends, each end being connected to the second ends of the two tubes respectively;

two wheel holders adjustably fastened to said base frame at the two opposite ends thereof, each of said wheel holders having a bearing plate, a wheel connected to a bottom side of the bearing plate, a mounting rod smaller than the sleeves extending laterally from the bearing plate and slidably inserted into the longitudinal through hole of the base frame from one of the opposite ends of the base frame, said mounting rod having a longitudinal series of pin holes and being releasably locked in position in the base frame by a lock pin extending through one of the pin holes in the base frame and into one of the pin holes of the mounting rod.

* * * * *